United States Patent [19]

Taudt et al.

[11] E Patent Number: Re. 32,139

[45] Reissued Date of Patent: May 6, 1986

[54] METHOD AND ARRANGEMENT FOR THE AVOIDANCE OF ERRORS DURING THE REPRODUCTION OF AN IMAGE PATTERN

[75] Inventors: Heinz Taudt, Kiel; Uwe Gast, Kiel-Rammsee, both of Fed. Rep. of Germany

[73] Assignee: Dr.-Ing. Rudolf Hell GmbH, Kiel, Fed. Rep. of Germany

[21] Appl. No.: 487,089

[22] Filed: Apr. 21, 1983

Related U.S. Patent Documents

Reissue of:

[64] Patent No.: 3,975,761
Issued: Aug. 17, 1976
Appl. No.: 559,895
Filed: Mar. 19, 1975

[30] Foreign Application Priority Data

Mar. 19, 1974 [DE] Fed. Rep. of Germany .... 2 413 034

[51] Int. Cl.[4] ..... H04N 1/21

[52] U.S. Cl. ..... 358/78; 358/264; 358/280; 360/32

[58] Field of Search ..... 358/78, 80, 280, 287, 358/297, 275, 264; 360/32

[56] References Cited

U.S. PATENT DOCUMENTS

| | | | |
|---|---|---|---|
| 2,691,696 | 10/1954 | Yule | 358/80 |
| 3,272,918 | 9/1966 | Koll | 358/287 |
| 3,374,311 | 3/1968 | Hell | 358/297 |
| 3,541,245 | 11/1970 | Wilby | 358/280 |
| 3,582,549 | 6/1971 | Hell | 358/275 |
| 3,636,251 | 1/1972 | Daly | 358/297 |
| 3,878,559 | 4/1975 | Pugsley | 358/78 |

FOREIGN PATENT DOCUMENTS

| | | |
|---|---|---|
| 28113 | 4/1973 | Japan . |
| 1413424 | 2/1976 | United Kingdom . |

*Primary Examiner*—Howard W. Britton

[57] ABSTRACT

A method for the reproduction of an image pattern disposed on a substantially nonuniformly driven scanning drum, wherein the image pattern is photoelectrically scanned point-by-point and line-by-line to generate an image pattern signal having an analog relationship to the image pattern and the image pattern signal is used to record on at least one recording drum driven substantially nonuniformly and independently of the scanning drum, features generating a scanning timing signal in synchronism with the rotational movement of the scanning drum, converting the image pattern signal to a digital signal in synchronism with the scanning timing signal, storing the digital signal in a storage unit measure-by-measure in synchronism with the scanning timing signal, generating a recording timing signal in synchronism with the rotational movement of the recording drum, reading out the digital signal from the storage unit measure-by-measure in synchronism with the recording timing signal, and, thereafter, driving at least one recording member with the digital signal to produce an image reproduction on the recording drum.

9 Claims, 7 Drawing Figures

METHOD AND ARRANGEMENT FOR THE AVOIDANCE OF ERRORS DURING THE REPRODUCTION OF AN IMAGE PATTERN

Matter enclosed in heavy brackets [ ] appears in the original patent but forms no part of this reissue specification; matter printed in italics indicates the additions made by reissue.cl BACKGROUND OF THE INVENTION

The present invention relates to a method and to an arrangement for the avoidance of errors during the reproduction of an image pattern wherein the image pattern is arranged on a driven scanning drum which could be nonuniformly driven, is scanned by photo-electrical means point-by-point and line-by-line to generate image data to be recorded on a recording medium which, in turn, is arranged on a recording drum driven independently of the rotation of the scanning drum and possibly nonuniformly.

In one example, the method according to the present invention avoids image errors and screen distortions and finds use in a printing form engraving arrangement for gravure printing.

To begin with, the mode of operation of a printing form engraving arrangement is described and the problem to be solved is discussed.

In a scanning machine, an image pattern is mounted in a stretched-out manner on a scanning cylinder to be rotated, with the image pattern being scanned in a helicoidal manner by a light spot of scanning member which is guided in parallel to the scanning cylinder. The image pattern can contain half-tone images and lettering. Depending on the tone-value of the scanned image points, more or less light is reflected from the image pattern onto the scanning member and is photo-electrically converted to an image signal. For screening the imagine pattern, a screen timing signal is superimposed over the image signal.

In the engraving machine, an engraving member, e.g. in the form of a mechanical engraving system, moves parallel to a rotating printing cylinder and uses an engraving needle as a cutting tool. The screen timing signal and the image signal control the engraving member. The screen timing signal brings about a vibrating lifting movement of the engraving needle and during the recording process, the engraving needle cuts a series of cavities or cups, which are arranged in a ruled screen, out of the surface of the rotating printing cylinder. The image signal or the tone values of the scanned image points determine the depth of the engraved cavities.

The engraving machine can also use an electron ray or Laser beam gun. In these cases, the cavities are formed through the action of the radiation on the surface of the printing cylinder. The screen timing signal then determines the firing sequence and the image signal the intensity of the radiation.

The engraved printing cylinder is the printing form for a gravure rotary machine. Prior to the printing process, the color transmission from the cavities onto the printing carrier takes place. The tone value of a printed surface is determined by the volume of the cavities arranged in a screen-like manner in this surface and by the quantity of color stored in these cavities.

For the reproduction of a multicolored image pattern, each color extraction or color separation engraves one printing cylinder. In the gravure rotary machine the superimposed printing of the differently colored printing cylinders onto the printing medium takes place during one sequence of operation.

Especially in the multicolor printing process, a high reproduction quality requires an accurate production of the printing cylinder of a color set, with an accurate arrangement of the cavities in a ruled screen.

Some of the factors which essentially influences the accuracy of the production of the printing form, are the uniformity of the circumferential speed of a cylinder with respect of a stationary point and the synchronous and surface correspondence between the scanning cylinder and the printing cylinder.

An image defect occurs in the case of a nonuniform circumferential speed of one of the cylinders. This image defect becomes magnified when the respective circumferential speeds of scanning and printing cylinders fluctuate. An image defect manifests itself first of all in that a straight line in the image pattern undergoes a vibrating motion and is recorded on the printing cylinder in an inaccurate position.

In the case of an inaccurate positioning of the engraving onto the printing cylinder of a color set, errors in proper matching occur during the superimposed printing of several colors to form a multicolor print and considerably reduces the quality of a printing image.

The structure of a ruled screen is determined by the interrelationship between the circumferential speed of the printing cylinder, the screen timing signal and the rate of advance of the engraving member. If any one of these parameters is not stable, distortions of the ruled screen occur.

In the case in which the circumferential speed of the printing cylinder is nonuniform and the circumferential speed related to the stationary engraving member is controlled by a constant screen timing signal which, in turn, is independent of the rotational movement of the printing cylinder, the above described distortions of the ruled screen occur during the reproduction in addition to the image defects.

In order to give a concept of the required accuracies, it is pointed out here that the deviation of the location of an engraved cavity from its ideal location is not allowed to be greater than about 2 microns.

If greater periodic deviations occur and if they combine to patterns on the large surface, a moire pattern occurs during the engraving process and the human eye finds such a pattern disturbing, especially when viewing the finished printing image.

Moreover, during the joint printing of several colors to a multicolor print, the distortions of the ruled screen make themselves known in the color shift which likewise influences the quality of a print of a considerable extent. When speaking of the color shift this refers to the statistic or periodic coverage or non-coverage of printing points of different color.

Up to now, it has been assumed herein that during the reproduction of an image pattern a scanning machine works together in each case with an engraving machine.

However, when printing magazines, one is frequently faced with the problem of having to produce simultaneously several uniform printing cylinders from one image pattern or of having to produce simultaneously all four printing cylinders of a color set from one colored image pattern.

For this task, a scanning machine is combined with several engraving machines to an engraving installation.

A second scanning machine (commonly called a mask-machine) is utilized for the control of the recording and to copy lettering onto the image patterns. While the scanning drum of the first scanning machine bears the image patterns to be reproduced, a [control-maks] *control-mask* or control frame is arranged on the scanning drum of the second scanning machine. By scanning of this control mask, the necessary control signals are obtained. These working procedures likewise require an accurate synchronism of all cylinders.

In the known engraving installations, each cylinder is driven via a driving gear by a synchronous motor designed especially for very uniform rotational movements. Each synchronous motor is energized by a frequency converter. From a primary network system, a converter creates an artificial secondary network system, the frequency of which is determined by the frequency of a guidance timing signal controlling the converter. The rotational speed of the synchronous motor is proportional to the frequency of the secondary network system and therewith is also proportional to the frequency of the guidance timing signal of the converter. The advance movements of the scanning and engraving member are likewise generated by synchronous motors energized by converters. The guidance timing signals of the converter and also the screen timing sequence are derived through frequency-division from the frequency of a quartz-crystal-controlled oscillator. It is achieved thereby, that at least the rotary fields of the synchronous motors and the scanning timing sequence are in phase-locked relationship to one another. To be sure, the scanning cylinder and the printing cylinder rotate in synchronous manner, but the angle between them is not maintained as accurately, as for both cylinders coupled by a common shaft.

As is known, the rotary field and the rotor of a synchronous motor are not tightly coupled. For this reason, a synchronous motor reacts to load fluctuations with a change of its load-angle. In the case of sudden load-changes, the transition to the new operating condition takes place under oscillations of the rotor with respect to the rotary field. Load fluctuations which are based on imbalances of the driven cylinder and of the driving gear or based on nonuniform bearing-friction, in practice cannot be avoided, so that changes of the load-angle occur.

In addition, gear-wheel play in the drive unit is a source of variations. Accordingly, the angle-follow of rotational movements of scanning and engraving cylinders are not dependable and image defects occur.

No strong relationship necessary for the constructions of an accurate ruled screen exists between the scanning timing signal which determines the points of time of the engraving of the cavities, and the circumferential speed of the printing cylinders to determine the position at a given moment of the cylinder surface in relation to the engraving member.

This results in distortions of the ruled screen and leads to the mentioned defects.

It is known to use in engraving installations a special motor which responds with only a very slight change of its load-angle to load changes and is well damped, but the coupling between the rotary field and the rotor cannot be considered to be a rigid one. Furthermore, the gear wheel play is not eliminated so that despite a considerable expenditure in the driving means image defects as well as other distortions of the ruled screen can occur and thereby [considerable] *considerably* reduce the reproduction quality. In the case of gravure, it is furthermore desired to engrave cylinders having relatively large dimensions. Higher drive powers are required to accomplish this.

Prior art systems and methods have the operating speed of an engraving installation limited by the operating speed of the mechanical engraving system, although the latter can be considerably increaded through the utilization of engraving members operating with an electron ray or a laser-beam gun for which the circumferential speeds of the cylinders is increased or the number of revolutions of the motor which activates the cylinders is increased.

In contrast, an increase of the performance and of the number of revolutions is not possible in the case of the known special motors, so that other driving means have to be utilized. Furthermore, for the drive means for the cylinders, it is desirable to strive as much as possible to utilize commercial motors which are to be energized from the electric mains, so as to reduce expenditures in time and costs incurred by special motors energized through converters.

Commercial motors, however, show fluctuations in synchronism and, when used in engraving installations, result in image defects and screen distortions for this reason.

In another known engraving installation, screen distortions are avoided by using a screen timing sequence derived from the rotational movement of the printing cylinder in connection with a timing generator, but the image defects are present therein, as in other systems. For this reason, the instant invention is based on the task of eliminating the cited disadvantages and of providing a process which, by the utilization of commercial motors for the drive of the cylinders, avoids image defects and screen distortions.

SUMMARY OF THE INVENTION

The instant invention features generating a scanning timing signal through a first timing generator from the rotational movement of the scanning drum, scanning the image pattern photo-electrically to produce an image signal, digitizing the image signal obtained through the scanning of the image pattern with the aid of the scanning timing signal, recording measure by measure the digitized data in a storage device, generating a recording timing signal through a second timing generator from the rotational movement of the recording drum, and with the aid of said recording timing signal, reading out the stored data measure for measure, whereby the data read out can be used to energize one or more recording members.

For the purpose of changing the dimensions of an image in the course of the reproduction of an image pattern, it is known from U.S. Pat. No. 3,272,918 to store the image pattern in a temporary storage. Thereby, the analogous image signal is digitized, recorded in a digital storage unit with a speed which can be selected at will but is substantially constant, and then read with another, yet substantially constant speed. The data which have been read are likewise reconverted into an analog image signal which can be used to control the recording member. The reproduction-scale is determined by the chosen ratio recording speed to reading speed, or scanning timing sequence signal to recording timing sequence signal.

The scanning timing sequence signal and the recording timing sequence signal are derived from the signal of a master oscillator through frequency division into variable divider stages. This method for the change in dimensions requires an absolute synchronism of scanning cylinder and printing cylinder during the reproduction process. This synchronism is achieved through the costly converter-drive referred to in the introduction of the specifications wherein each synchronous motor is energized by a converter which creates an artificial secondary network system. Commercially available motors cannot be used.

The process according to the invention also makes use of a temporary storage, but does not have as its goal to achieve changes in dimensions in the course of the reproduction. It aims at avoiding image defects and distortions of the ruled screen.

In contrast to the process in the aforementioned patent, the scanning timing signal and the recording timing signal are not derived from the signal of a master oscillator through frequency division. The scanning timing signal is derived directly from the nonuniform rotational movement of the scanning cylinder with the aid of a first timing generator.

Through this, the scanning timing signal is [s] subordinated to the accurate location of the cylinder surface and fluctuates with the nonuniform rotational movement of the cylinder.

Thus, the point of time of the scanning of an image point is not determined by the time-based course of the scanning timing signal as in prior art, but is determined by the point of time of the scanning by the scanning device, of the markings stationarily arranged on the cylinder surface. Likewise, an exact time-wise connection is always guaranteed between such functions as scanning, digitizing and recording in the storage unit.

Also the frequencies of the recording and the screen timing signals fluctuate with the rotational movement of the printing cylinder. Through the fixed correlation between the screen timing signal and the cylinder surface, the cavities are accurately positioned in the ruled screen and distortions are avoided. Through the temporary storage, one achieves a time-based decoupling of the scannng and recording. At the point of time which had been determined by the screen timing signal, it is not the image point which had just been scanned that is recorded, but what is recorded is the image point which had been deposited at a certain address, as a result of which image defects are avoided.

Whereas in the process indicated in the aforementioned patent the image points of an entire image line are stored, it suffices, on the bases of the process designed in accordance with the instant invention, to temporarily store only as many image points as are apportioned to the possible relative displacement of the two cylinders, owing to the fluctuations in synchronism.

BRIEF DESCRIPTION OF THE DRAWINGS

The characteristics of the invention characterized in the claims and further characteristics of the invention will become evident from the exemplified embodiments described in the following and illustrate in FIGS. 1 to 6:

DESCRIPTION OF THE PREFERRED EMBODIMENTS

Figure 1:
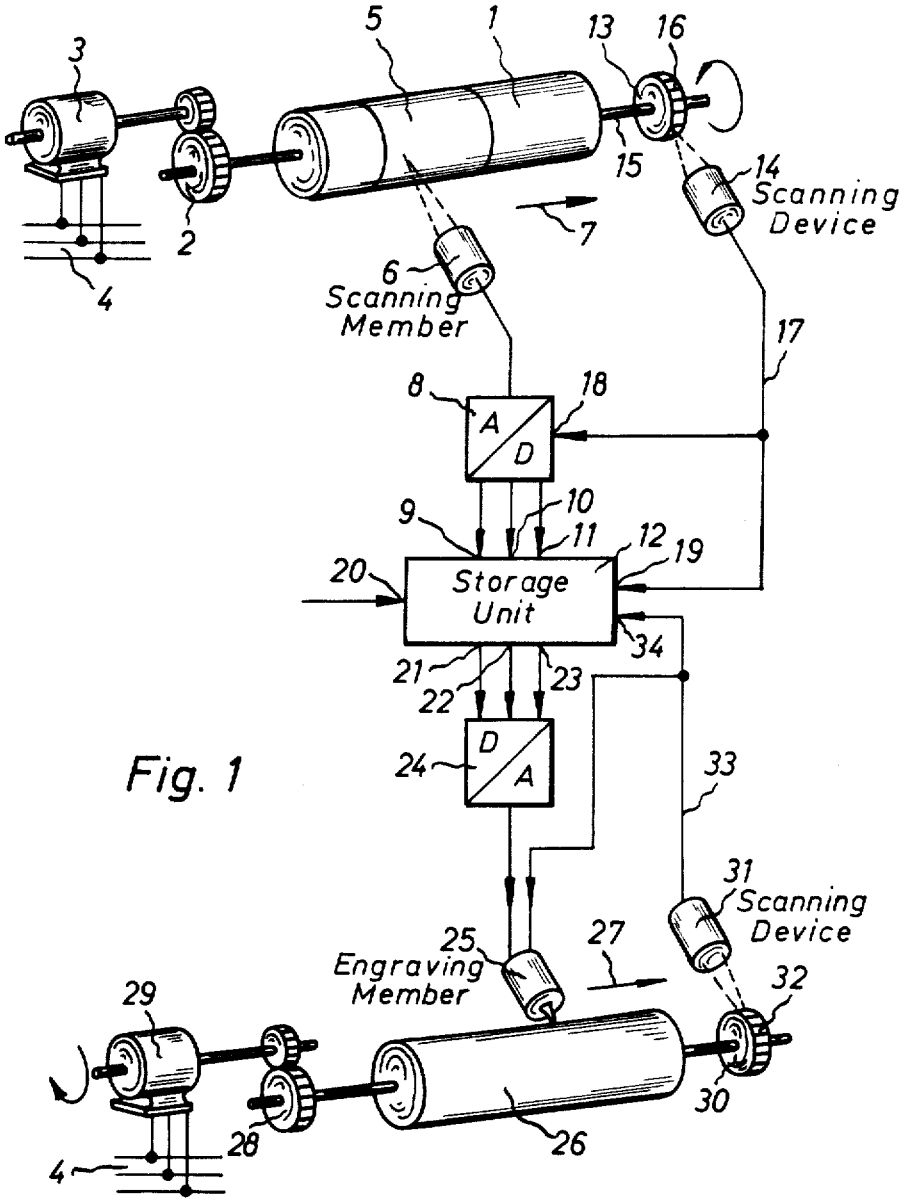
FIG. 1 shows an embodiment of the instant invention for an engraving installation including a single-scanning machine and a single engraving machine.

In FIG. 1, there is illustrated a process designed in accordance with the present invention wherein there is utilized an engraving installation including a single scanning machine and a single engraving machine.

A scanning cylinder 1 of a scanning machine which is not illustrated, is driven via a driving unit 2 by a synchronous motor 3, which is energized by a network 4. In order to obtain an image signal, an image pattern 5 which is mounted on the scanning cylinder 1 is scanned photo-electrically by a scanning member 6 which moves parallel to the scanning cylinder in the direction of arrow 7. The scanning member 6 is connected with the analog-input terminals of an analog-digital-converter 8. The digital output signal of the analog-digital converter 8 are connected to the data input terminals 9, 10, and 11 of a storage unit 12. The first timing generator includes a disc 13 and a scanning device 14. The disc 13 is rigidly connected with a shaft portion 15 of the scanning cylinder 1. On its peripheral surface, the disc 13 bears markings in form of a bar pattern 16 and this bar pattern is scanned photo-electrically by the stationary scanning device 14 to generate a scanning timing signal. The number of the markings corresponds to the number of the image points to be scanned on a single peripheral line. The markings can just as well be arranged on the surfaces of the disc 13 which lie perpendicular to the shaft 15 or on the shaft 15 or on the surface of the scanning cylinder 1. A prerequisite is only an accurately located, rigid connection between the markings and the scanning cylinder 1. In place of a photoelectric scanning device 14, mechanical or electrical or magnetic scanning devices can be used to scan corresponding appropriate markings. Via a circuit line 17, the scanning device 14 is connected with a [timping-input ] *timing-input* terminal 18 of the analog-digital converter 8 and with a control-input terminal 19 of the storage unit 12 for the control of the recording process. With a signal to an additional input terminal 20 of the storage unit 12, the recording process can be initiated.

The data-output terminals 21, 22 and 23 of the s storage unit 12 are connected to the digital-inputs of a digital-analog-converter 24, the analog-output terminal of which is connected with an engraving member 25. The engraving member 25 which, in the direction of an arrow 27, moves parallel to a printing cylinder 26 of an engraving machine which is not illustrated, makes the recording on the printing cylinder 26. Via a driving unit 28, the printing cylinder 26 is likewise driven by a synchronous motor 29 which is energized from the network 4.

A second timing generator includes an additional disc 30 and another scanning device 31. On the peripheral surface of the disc 30, markings in from of a bar pattern 32 are likewise arranged, and this bar pattern is scanned photo-electrically for the generation of a recording timing signal which is also the screen timing signal. The number of markings corresponds to the number of cavities to be recorded on a single peripheral line of the printing cylinder 26.

The variants given herein for the first timing generator apply, of course, to the second timing generator. Via a circuit line 33, the scanning device 31 is connected with the engraving member 25. An additional control-input signal 34 to the storage unit 12 provides for the control of the reading process from the storage unit 12.

The mode of action of the described circuit is the following:

The possible amplitude range of the analog image signal obtained in the scanning member 6 through scanning of the image pattern 5, is subdivided into a finite number of amplitude ranges. In the analog-digital converter 8, the analog image signal is interrogated at certain time intervals established by the scanning timing signal. The measured instantaneous amplitudes of the image signal represent the tone-values of the scanned image points and are quantized by the comparison to the selected amplitude ranges and, in form of a storage-value, are available at the data-input terminals 9, 10, and 11 of the storage unit 12.

Figure 2:
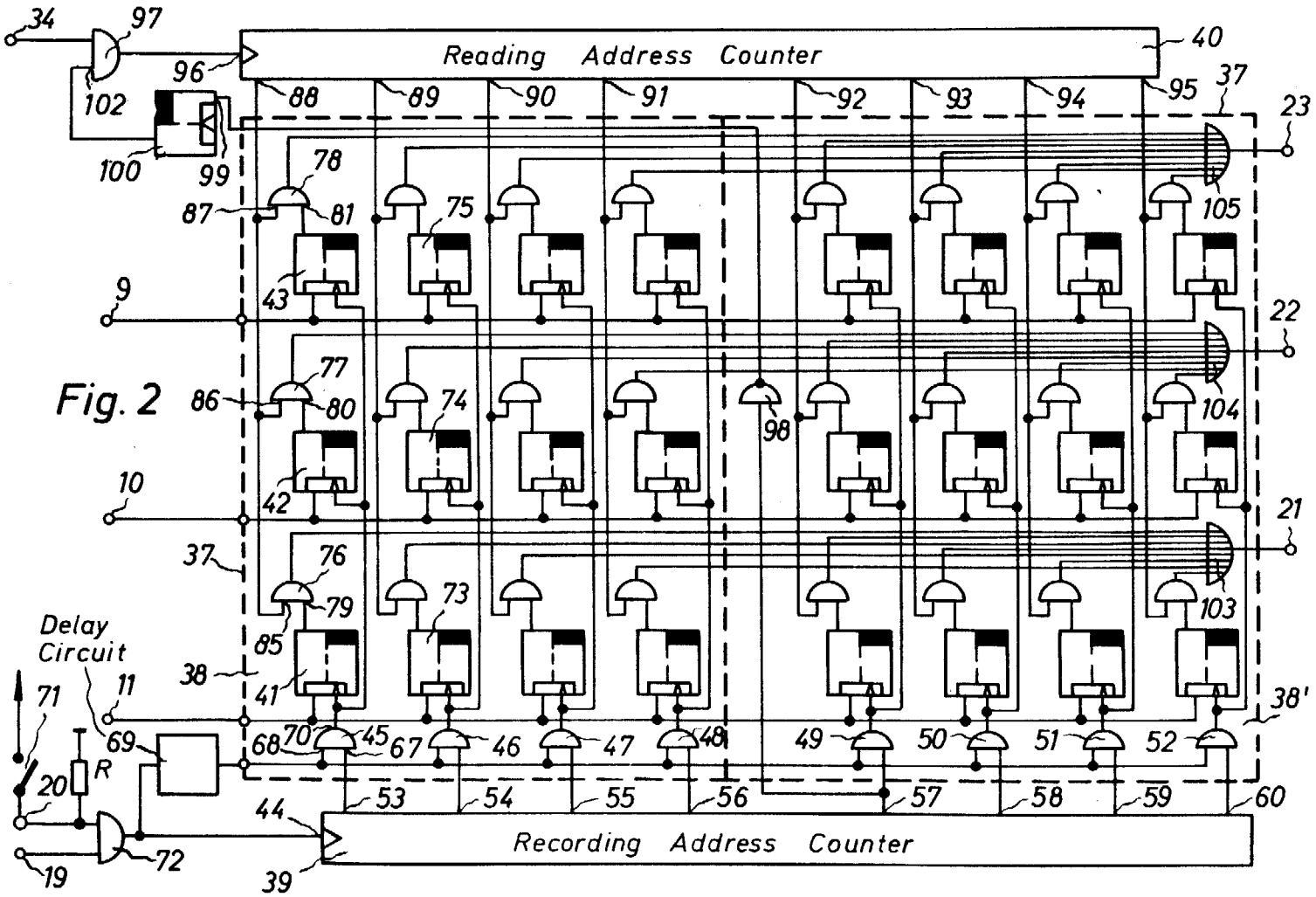
FIG. 2 shows an embodiment of a storage unit used in the instant invention.

The storage unit 12, which is illustrated in detail in FIG. 2, includes address counters and a memory unit. The memory unit is arranged as a system of storage places which, in each case, can receive one word. The addresses of the storage place can be preselected. The process of recording the data in the memory unit is initiated by a signal at the input terminal 20 of the storage unit 12. This signal is generated after the startup of the synchronous motors 3 and 29 at a point of time at which the cylinders are already rotating in a synchronous manner and the reproduction of the image pattern is to begin.

During the recording, the addresses under which the data are to be deposited in the storage places are selected, through the signal at control input terminal 19 of the storage unit 12, in the measure or cycle of the scanning timing signal.

The scanning timing signal control the digitizing of the analog image signal in the analog-digital converter 8 as well as the recording in the memory unit so that the data characterizing a scanned image point appear at the data input terminals 9, 10 and 11 at the same timing sequence as the address instruction. As a result of this, the data are deposited in the memory unit in the sequence established by the scanning process.

The reading of the stored data is controlled by the recording timing signal through the intervention of the control input 34 of the storage unit 12. The data which have been read are converted in the digital-analog converter 24 in a known manner into an analog image signal to control the engraving member 25.

If, as in the case of the preferred embodiment, synchronous motors are utilized, then the relative displacement of the cylinders will solely depend on the load-angle changes of the respective synchronous motors. In this case, it suffices to temporarily store only a few image points in a low capacity memory unit. It is also possible to use any other kind of motor. Under those conditions one has to count on a considerably greater relative displacement of the cylinder, the memory capacity will have to be increased correspondingly.

The storage unit 12, which in FIG. 1 is only illustrated in form of a functional block, is shown in detail in FIG. 2. The storage unit 12 includes the digital-storage unit 37 with storage areas 38 and 38', of a recording-address counter 39 and of a reading-address counter 40. So as to make the illustration readily comprehensible, each storage area is only equipped with 3 bits each for the storage of four words. Thus, eight image points can be temporarily stored. The storage capacity can be increased.

The storage area of the first address includes three D-flip-flops 41, 42 and 43. A D-flip-flop possesses one timing input terminal and one information input terminal D. Through the sides of the pulse signal of the timing signal at the timing input terminal, the state of the flip-flop is changed in the manner as it is given by the state of the signal at the information input terminal D in front of the pulse signal.

For the address selection in the course of the recording, a recording address counter 39 and a number of AND-gates 45 to 52 are provided. The recording address counter 39 includes a timing input signal 44 and eight output signals 53 to 60. In its mode of functioning, the address counter 39 is a ring-counter. A ring-counter is to be thought of as eight flip-flops which are joined together to a ring, whereby in each case one output signal of each flip-flop is identical with one output signal of the address counter. The conditioning input terminals of the flip-flops are coupled in such a manner with one another that in each case only one output signal of the address counter lies in the high region, while all other output signals lie in the low region.

After each timing pulse signal at the timing input terminal 44, the next output signal lies in the high region. If the last output signal 60 is in the high region, then, after the next following timing pulse signal at the timing input terminal 44 the first output signal 53 lies again in the high region.

For the selection of the first address, the output signal 53 of the recording address counter 39 is connected to an input terminal 67 of the AND-gate 45. The second input terminal 68 of the AND-gate 45 is connected, via a timing delay circuit 69, to the timing input terminal 44 of the recording address counter 39. The output terminal 70 of the AND-gate 45 is connected with the timing input terminals of the flip-flops 41, 42 and 43.

Upon closure of switch 71, the scanning timing signal at the control input erminal 10, is connected through to the timing input terminal 44 of the recording address counter 39 through an AND-gate 72. After the first timing pulse of the scanning timing signal, output signal 53 lies in the high region. Also, the first timing pulse of the scanning timing signal, which had been delayed in the timing delay circuit 69, reaches the timing input terminals of the flip-flops 41, 42 and 43 via the AND-gate 45. At this point in time, the information in the form of data is present at the data input terminals 9, 10 and 11 is taken over, via the information input terminals of the flip-flops 41, 42, and 43.

With the second timing pulse of the scanning timing signal, output terminal 53 goes into the low range and output terminal 54 into the high range. Therewith, the address of the second storage location, including flip-flops 73, 74 and 75, is selected, and the data present at the date input terminals 9, 10 and 11, are deposited under the second address.

After four timing pulses of the scanning timing signal, the storage area 38 is fully loaded and with the fifth timing pulse, the recording of the data in the storage area 38' begins and the reading of the data deposited at the first address in the storage area 38 begins as well. For this purpose, three AND-gates 76, 77 and 78 are provided, the input terminals 79, 80 and 81 of which are connected respectively with the Q-output terminals of the flip-flops 41, 42 and 43.

The additional input terminals 85, 86 and 87 of the AND-gates 76, 77 and 78 are jointly connected to the first output terminal 88 of the reading address counter 40. The mode of operation of the reading address counter 40 corresponds to that of the recording address counter 39. The reading address counter 40 likewise possesses several output terminals 88 to 95 and possesses a timing input signal 96. The timing input signal 96 from AND-gate 97 is produced by the control input signal 34 of the storage unit 12, at which the screen timing signal lies. For the control of the AND-gate 97, output signal 57 of the recording address counter 39 is connected, via an inverter 98, with a setting input terminal 99 of a D-flip-flop 100. When the storage area 38 is filled-up and the reading process is to be initiated, output signal 57 of the recording address counter 39 lies in the high range and the flip-flop 100 is set. Therewith, the Q-output terminal of the flip-flop 100 and the input terminal 102 of the AND-gate 97 likewise come into the high region and the recording timing signal is connected through from control input signal 34 of storage unit 12 to the timing input signal 96 of the reading address counter 40. Through this, the reading process from the storage area 38 is initiated. With the first timing pulse signal of the recording timing signal appearing at timing input signal 96, output terminal 88 of the reading address counter 40 lies in the high region. The data deposited under the first address then reach data output terminal 21, 22 and 23 of the storage unit 12, via the AND-gates 76, 77 and 78 and via the OR-gates 103, 104 and 105.

The reading of the storage area 38 is finished with the fourth timing pulse of the recording timing signal and the reading of the storage area 38' is finished after the eighth timing pulse of the recording timing signal. After this, a new recording reading cycle begins.

Figure 3:
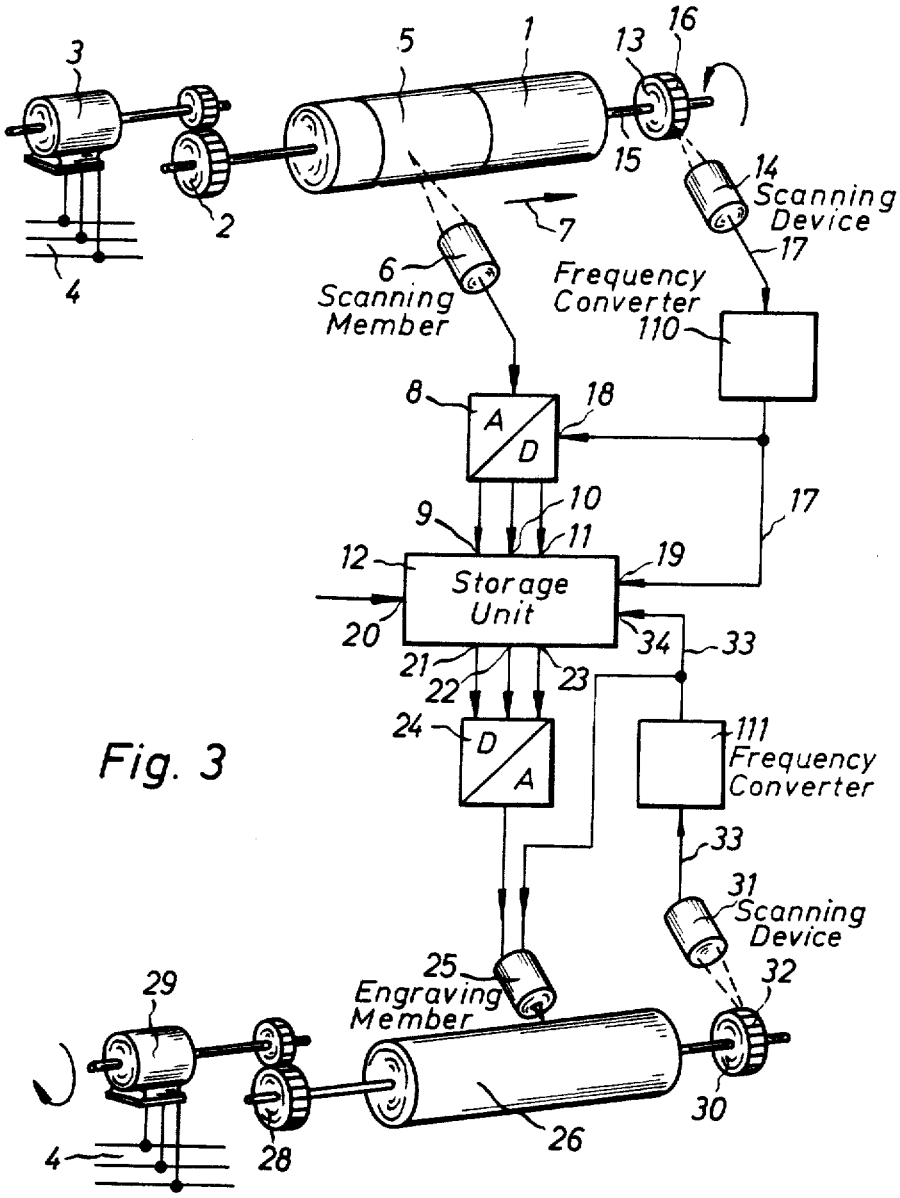
FIG. 3 shows another embodiment of the instant invention.

FIG. 3 shows an advantageous further development of the arrangement shown in FIG. 1. The advantageous further development includes therein the generation of the scanning timing signal or the recording timing sequence signal through the frequency conversion of the timing signals created by the direct scanning of the discs. Thereby, the ratio of the frequency conversion is adjustable. The generation of the scanning timing signal and of the recording timing signal through frequency conversion has the advantage that changes of the frequencies of the timing signals necessary for the adaptation to different cylinder diameters, screens, etc., can be accomplished through a change of the frequency conversion factor without a change in discs.

For the frequency conversion, a frequency converter 110 is inserted into the circuit line 17 and an additional frequency converter 111 is inserted into the circuit line 33 of the arrangement shown in FIG. 1. The additional arrangement shown in FIG. 3 corresponds to the circuit in FIG. 1.

The frequency conversion can be accomplished either through frequency division or through frequency multiplication.

In the case of the frequency division, the frequency converters 110 and 111 are adjustable division stages which, to give an example, can be made up of the decimal counter Ser. No. 74192 manufactured by Texas Instruments or the like. These counter components are commercially available and known to the expert in the field, making a more detailed description superfluous. In the case of the frequency multiplication, the frequency converters 110 and 111 can be phase lock loop circuits with appropriate feedback networks.

Figure 4A:
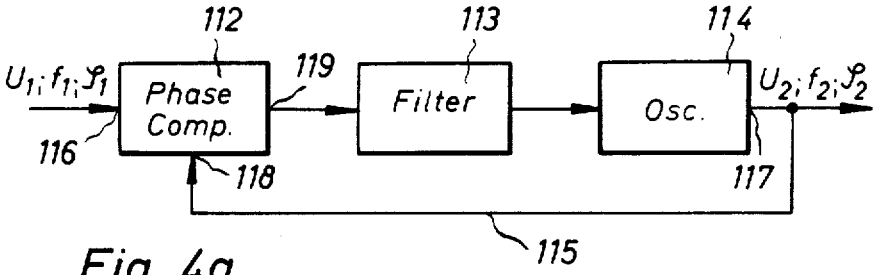
FIGS. 4a and 4b show an exemplified embodiment for a frequency multiplier for use in the instant invention.

The phase lock loop circuit shown in FIG. 4a is suitable for the invention and will be described in more detail in the following.

The phase lock loop circuit includes a phase comparator 112, a low pass filter 113, and a voltage controlled oscillator 114 interconnected to include a feedback branch 115.

An input voltage $U_1$, with the frequency $f_1$ and the phase $\phi_1$, arrives at the input terminal 116 of phase comparator 112. The output voltage $U_2$, with the frequency $f_2$ and the phase $\phi_2$, arrives at the output terminal 117 of the voltage controlled oscillator 114. Via the feedback branch 115, the signal at output terminal 117 is fed back to a second input terminal 118 of the phase comparator 112. In the phase comparator 112, the voltages present at inputs 116 and 118 are compared with respect to their frequency and their phase. In the stationary state of the circuit, a frequency uniformity prevails, however, a constant phase shift of 90° of voltages $U_1$ and $U_2$ is present as well. If the phase of the input voltage $U_1$ or of the output voltage $U_2$ changes, then an error signal which is proportional to the phase change appears at the output terminal 119 of the phase comparator 112. As the phase comparator 112 works as a multiplication stage, the error signal includes D.C. voltage and A.C. voltage components. The D.C. voltage component is selectively filtered by the low pass filter 113 and serves as the control signal for the voltage controlled oscillator 114. The control signal effects a change of the frequency $f_2$ of the output voltage $U_2$, and therewith also of the phase $\phi_2$, until the deviation or error signal is regulated out.

Figure 4B:
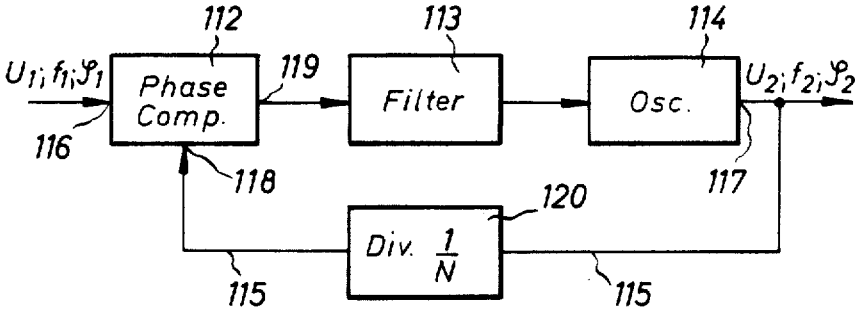

FIG. 4b shows the manner in which the base circuit of a phase lock loop circuit according to FIG. 4a is modified to be a frequency multiplier. For this purpose, a frequency dividing stage 120 with the divider ratio N, is inserted into the feedback branch 115. Under those conditions, an output voltage $U_2$ with the N-fold frequency of the input voltage $U_1$ is then available at output 117, with both voltages being phase locked with respect to one another. To give an example, the phase lock loop circuit could be a circuit of the CD 4046 A type of the RCA Company as described in RCA Information Bulletin ICAN-6101.

Figure 5:
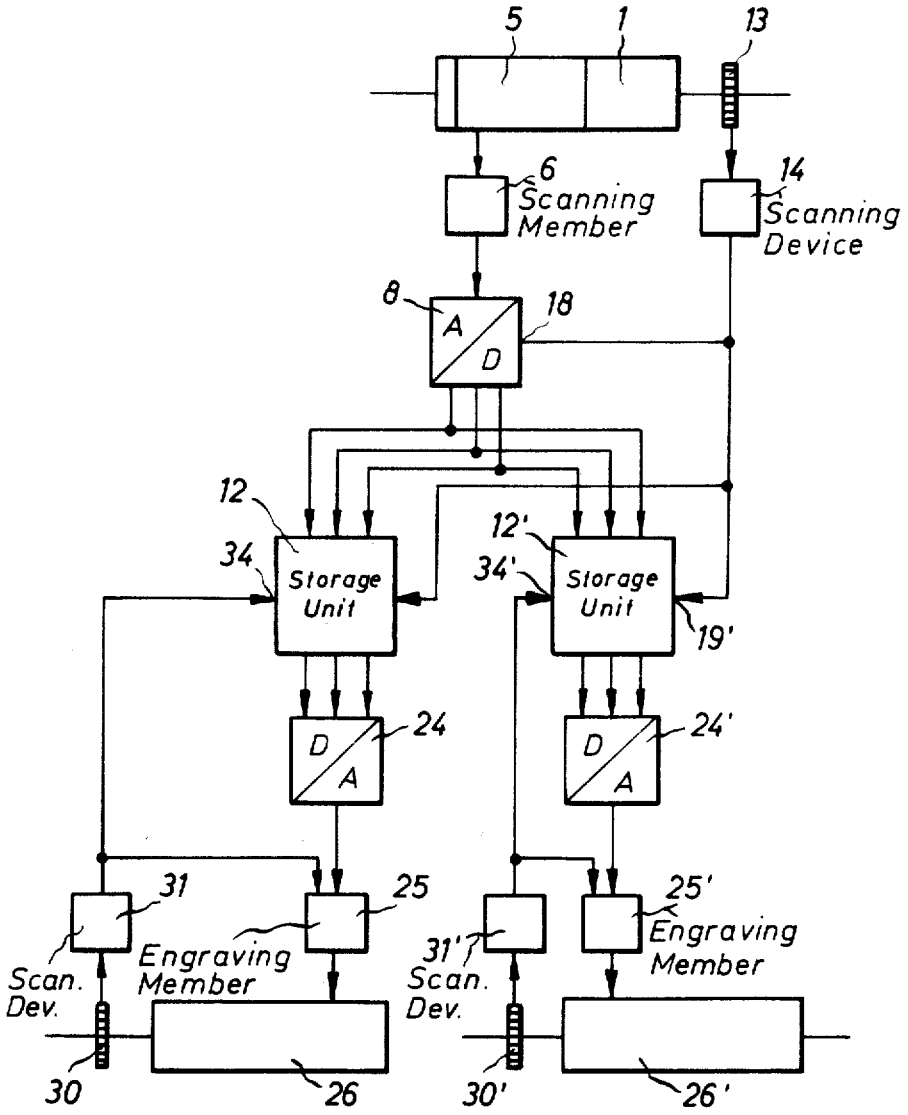
FIG. 5 shows a further embodiment of the instant invention wherein there is a single scanning maching and at least two engraving machines.

FIG. 5 shows an arrangement for the execution of the instant process in the case of an engraving installation which, to give an example, includes a scanning machine and two engraving machines.

The image pattern 5, arranged on the rotating scanning cylinder 1 of the scanning machine which is not illustrated there, is scanned photo-electrically by means of the scanning member 6. The obtained image signal is digitized in the analog digital converter 8 and the data are fed to the storage unit 12 as well as to an additional storage unit 12'.

The digitizing process of the image signal in the analog digital converter 8 and the recording of the data in the storage area of the storage units 12 and 12', are controlled via the control inputs 19 and 19' through the scanning timing signal, which is obtained with the aid of the timing generator including the scanning device 14 and the disc 13, in a manner described above.

The data read from the storage unit 12 are reconverted in the digital analog converter 24 into an analog image signal which controls the engraving member 25. The engraving member 25 is responsible for the recording on the engraving machine's printing cylinder 26 which is driven independently of the rotational movement of the scanning cylinder 1.

The recording timing signal is derived from the rotational movement of the printing cylinder 26 through the use of the timing generator formed by the scanning device 31 and by the disc 30. Via the control input terminal 34, the recording timing signal controls the reading of the data from the storage unit 12 and effects the resolution of the scanned image pattern 5 during the recording on the printing cylinder 26.

The data read from the other storage unit 12' are likewise converted into an analog image signal in an additional digital analog converter 24', with the analog image signal controlling an engraving member 25'. The engraving member 25' records on a second printing cylinder 26', which is driven independently of the rotational movement of the scanning cylinder 1 and of the printing cylinder 26 by means of a motor which is not illustrated. An additional recording timing signal is created with the aid of another timing generator, which includes a scanning device 31' and a disc 30'.

The recording timing signal, independently on the recording timing signal subordinated to the printing cylinder 26, controls the reading of the data deposited in the storage unit 12' via the control input 34' and likewise effects the resolution of the image pattern 5 during the recording on the printing cylinder 26'.

Through the temporary storage of the image signal in parallel storage groups and through the separate, independent control of the reading processes and of the resolution by each engraving machine, image defects and screen distortions are avoided in accordance with the concept of the invention. Also, in cases of engraving installations with several independently driven engraving machines, this is the case.

Figure 6:
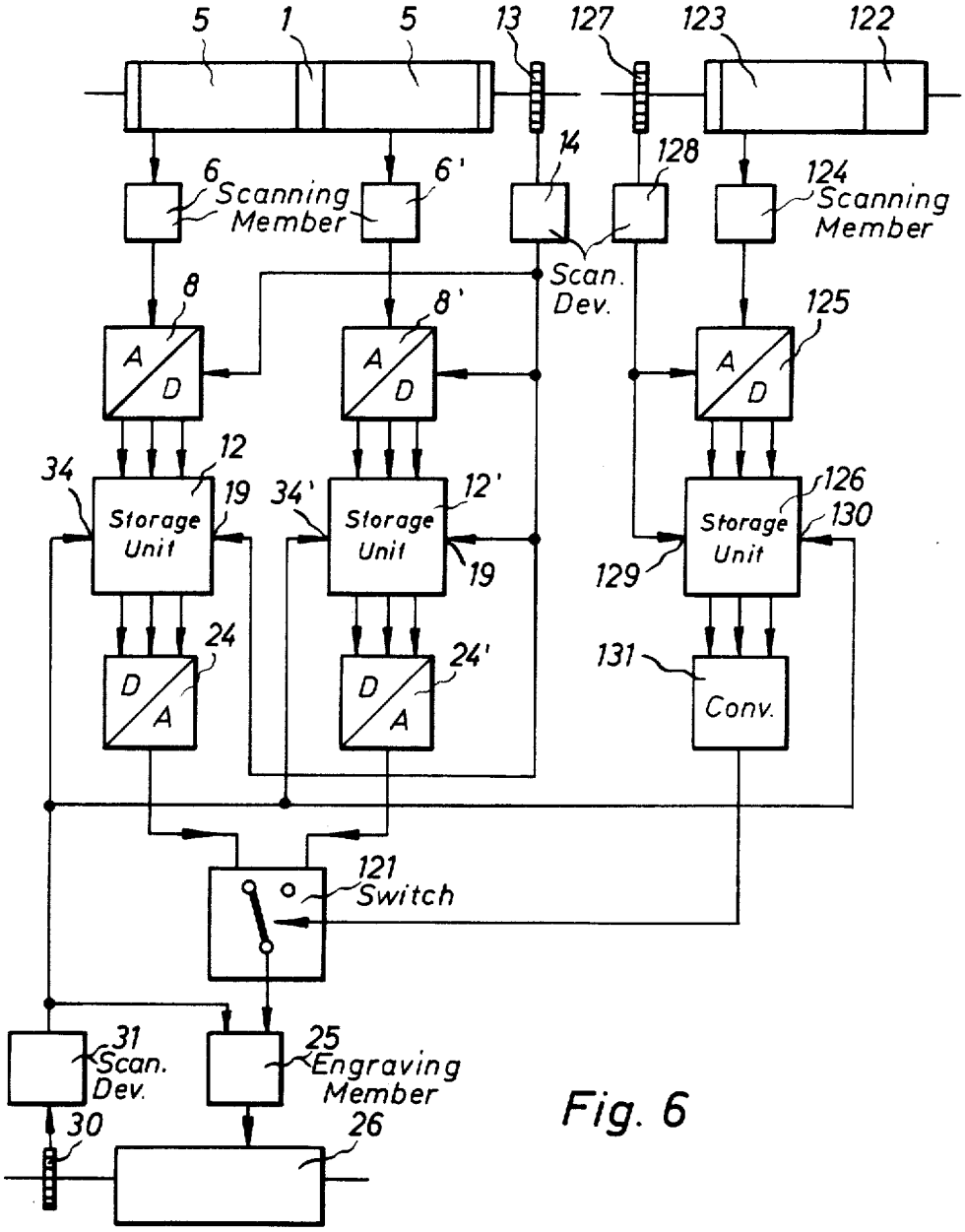
FIG. 6 shows yet a further embodiment of the instant invention wherein there are at least two scanning machines and a single engraving machine.

In FIG. 6, the concept of the invention is shown for an engraving installation which includes two scanning machines and one engraving machine.

On the rotating scanning cylinder 1 of a scanning machine, which is not illustrated, two image patterns 5 and 5' are arranged. The data which are obtained through scanning of image patterns 5 and 5' are deposited in the storage units 12 and 12'. The recording of the data is controlled through the scanning timing signal via the control inputs 19 and 19', with the scanning timing signal being derived from the rotational movement of the scanning cylinder 1 with the aid of the timing generator including the scanning device 14 and the disc 13.

The data read from the storage units 12 and 12' are converted into analog image signals in the digital analog converters 24 and 24', with the analog image signals being fed to a switch unit 121. In the switch unit 121, one of the two image signals is selected and connected through to the engraving member 25, which undertakes the recording on the printing cylinder 26 of the engraving machine. The reading process from the storage units 12 and 12' is controlled by the recording timing signal, via the control input 34 and 34'. The recording timing signal, which also undertakes the resolution of the image patterns, is obtained through scanning of the disc 31 with the aid of the scanning device 31.

The selection of the image signal in the switch unit 121 is controlled by a second scanning system. For this purpose, a control mask 123 which is mounted on an additional scanning cylinder 122, is scanned by a scanning device 123. The image signal in a known member, is digitized in an analog digital converter 125 and the data are deposited in an additional storage unit 126. The recording process is controlled by a scanning timing signal which is derived from the rotational movement of the scanning cylinder 122 by means of a disc 127 and a scanning device 128 and which is fed via a control input terminal 129 to the storage unit 126. The reading of the data deposited in the storage unit 126 is controlled by the recording timing signal, via the control input terminal 130.

The data which have been read are converted in a conversion stage 131 to a signal suitable for the control of the image signals in the change-over stage 121.

In the exemplified embodiments, the invention is used in engraving installations for photogravure printing, however, it can also find application in the case of drums of "scanners" driven independently of one another.

It could also be conceivable to make use of the present invention in order to avoid defects which occur as a result of the nonuniform movements of sliding carriages in flat base scanning, and recording devices. In this case, the scanning and recording timing signal is obtained through scanning, by means of stationary scanning devices, of markings which are rigidly connected with the sliding carriage, for example, markings in form of a bar pattern.

Having thus described the invention, what we claim as new and desire to be secured by Letters Patent, is as follows:

1. In a method for [the] *half-tone* reproduction of an image pattern disposed on a [substantially nonuniformly driven scanning drum,] *scanning drum rotating with a substantial nonuniform first speed,* wherein the image pattern is photo-electrically scanned point-by-point and line-by-line to generate an *analogue* image [pattern] signal [having an analog relationship to the image pattern and the image pattern signal is used to record on at least one recording drum driven substantially nonuniformly and independently of the scanning drum, the improvement comprising:] *and the image signal is used to record on at least one recording drum independently driven from said scanning drum and rotating with a substantial nonuniform second speed independently from said first speed, the improvement comprising:* generating a scanning timing signal in synchronism with the [rotational movement of said scanning drum;] *nonuniform first speed of the scanning drum;* converting said [image pattern signal] *analog image signal* to a digital signal in synchronism with said scanning timing signal;

[storing] *writing* said digital signal in a storage unit measure-by-measure in synchronism with said scanning timing signal;

generating a recording timing signal in synchronism with the [rotational movement of said recording drum;] *nonuniform second speed of the recording drum;* reading out said digital signal from said storage unit measure-by-measure in synchronism with said recording timing signal; [and, thereafter]

*generating a first signal from said recording timing signal used to screen the image reproduction on said recording drum, and* driving at least one recording member [with said digital signal to produce an image reproduction on the recording drum.] *by said digital signal read out from the storage unit and by said first signal to produce a half-tone reproduction on said recording drum.*

[2. The method as claimed in claim 1, wherein said recording timing signal is used to screen the image reproduction on said recording drum.]

3. The method as claimed in claim 1, further comprising a further image pattern disposed on a further scanning drum driven along with said scanning drum and a further storage unit and further comprising the steps of photo-electrically scanning point-by-point and line-by-line said further image pattern to generate a further image pattern signal having an analog relationship to said further image pattern;

converting said further image pattern signal to a further digital signal in synchronism with said scanning timing signal;

storing said further digital signal in said further storage unit measure-by-measure in synchronism with said scanning timing signal;

generating a further recording timing signal in synchronism with the rotational movement of said further recording drum;

reading out said further digital signal from said further storage unit measure-by-measure in synchronism with said further recording timing signal; and, thereafter, driving at least one further recording member with said further digital signal to produce a further image reproduction on said further recording drum.

4. The method as claimed in claim 1, further comprising a further storage unit and a further recording member, and further comprising the steps of storing said digital signal in said further storage unit measure-by-measure in synchronism with said scanning timing signal;

generating a further recording timing signal in synchronism with the rotational movement of said further recording drum;

reading out said digital signal from said further storage unit measure-by-measure in synchronism with said further recording timing signal; and, thereafter, driving said further recording member with said digital signal from said further storage unit to produce a further image reproduction on said further recording drum.

5. The method as claimed in claim 1, further comprising a further independently driven scanning drum on which a mask is disposed and further comprising the steps of photo-electrically scanning said mask to generate a control signal;

generating a further scanning timing signal in synchronism with the rotational movement of said further scanning drum;

converting said control signal to a further digital signal in synchronism with said control signal;

storing said further digital signal in a further storage unit measure-by-measure in synchronism with said further scanning timing signal;

reading out said further digital signal from said further storage unit measure-by-measure in synchronism with said control signal; and, thereafter, controlling the driving of said one recording member with said control signal.

6. The method as claimed in claim 1, wherein the photo-electrical scanning and the recording include respectively flat space scanning and recording devices.

7. The method as claimed in claim 6, wherein there are a plurality of scanning drums and of recording drums.

8. An apparatus for the reproduction of an image pattern disposed on a substantially nonuniformly driven scanning drum, wherein the image pattern is photo-electrically scanned point-by-point and line-by-line to generate an image pattern signal having an analog relationship to the image pattern and the image pattern signal is used to record on at least one recording drum driven substantially nonuniformly and independently of the scanning drum, the improvement comprising:

*first motor means for driving said scanner drum, second motor means for driving said recording drum, said first motor means operating at a speed which is independent of the speed of said second motor means and said second motor means operating at a speed which is independent of the speed of said first motor means;* first means operative to generate a scanning timing signal in synchronism with the rotational movement of said scanning drum;

converting means coupled to said image pattern signal and operative to convert said image pattern signal to a digital signal in synchronism with said scanning timing signal;

storage means coupled to said converting means and operative for storing said digital signal measure-by-measure in synchronism with said scanning timing signal;

second means operative for generating a recording timing signal in synchronism with the *nonuniform* rotational movement of said recording drum;

reading means connected to said storing means and operative for reading out said digital signal measure-by-measure in synchronism with said recording timing signal; [and]

*means generating a first signal from the recording timing signal; and,* coupling means operative to connect said digital signal from said storage means *and said first signal* to at least one recording member.

9. The apparatus as claimed in claim 8, wherein there is a further recording drum, said first means comprises a disc carrying indicia and mounted for rotation with said scanning drum, photo-electrical means for sensing said indicia and operative to generate said scanning timing signal, and further storage means coupled to said scanning timing signal and operative for the storage and reading out of said digital signal.

10. The apparatus as claimed in claim 8, further comprising a further scanning drum carrying a mask and mounted for rotation with said scanning drum, and third means operative for generating a control signal from said mask for controlling said reading means.

* * * * *